United States Patent
Kimba Dit Adamou et al.

(10) Patent No.: US 11,589,415 B2
(45) Date of Patent: Feb. 21, 2023

(54) RADIO BARRIER PROCESSING METHOD AND NETWORK DEVICE

(71) Applicant: VIVO MOBILE COMMUNICATION CO., LTD., Chang'an Dongguan (CN)

(72) Inventors: Boubacar Kimba Dit Adamou, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 123 days.

(21) Appl. No.: 16/761,395

(22) PCT Filed: Nov. 12, 2018

(86) PCT No.: PCT/CN2018/115040
§ 371 (c)(1),
(2) Date: May 4, 2020

(87) PCT Pub. No.: WO2019/096092
PCT Pub. Date: May 23, 2019

(65) Prior Publication Data
US 2021/0378051 A1    Dec. 2, 2021

(30) Foreign Application Priority Data

Nov. 16, 2017    (CN) .......................... 201711140728.4

(51) Int. Cl.
*H04W 76/30* (2018.01)
*H04W 76/10* (2018.01)
(Continued)

(52) U.S. Cl.
CPC ........... *H04W 76/30* (2018.02); *H04W 36/08* (2013.01); *H04W 48/16* (2013.01); *H04W 76/10* (2018.02)

(58) Field of Classification Search
CPC . H04W 76/15; H04W 36/0069; H04W 24/10; H04W 72/0453; H04W 72/14;
(Continued)

(56) References Cited

U.S. PATENT DOCUMENTS

| 2015/0045052 A1 | 2/2015 | Pao et al. | |
| 2015/0201354 A1* | 7/2015 | Zhang | H04W 36/0022 |
| | | | 370/221 |

(Continued)

FOREIGN PATENT DOCUMENTS

| CN | 104797000 A | 7/2015 |
| CN | 106332048 A | 1/2017 |

(Continued)

OTHER PUBLICATIONS

3GPP TS 36.300 V13.9.0, dated Sep. 2017 (p. 101-114) (Year: 2017).*

(Continued)

*Primary Examiner* — Daniel Lai
(74) *Attorney, Agent, or Firm* — von Briesen & Roper, s.c.

(57) ABSTRACT

A radio bearer processing method and a network device are provided. The method includes: establishing, when a first event is detected, a radio bearer (RB) with a mobile terminal, or refusing to establish the RB. The first event comprises at least one of: the secondary network device being added by a master network device accessed by the mobile terminal, configuration of the secondary network device being changed, or the mobile terminal being switched from another secondary network device to the secondary network device.

14 Claims, 5 Drawing Sheets

(51) Int. Cl.
*H04W 36/08* (2009.01)
*H04W 48/16* (2009.01)

(58) Field of Classification Search
CPC ..... H04W 36/08; H04W 76/11; H04W 76/18; H04W 72/0406; H04W 76/34; H04W 72/04; H04W 76/20; H04W 76/12; H04W 24/02; H04W 76/30; H04W 84/045; H04W 48/12; H04W 76/10; H04W 28/18; H04W 36/04; H04W 68/02; H04W 74/002; H04W 24/04; H04W 76/00; H04W 36/0027; H04W 72/1278; H04W 76/25; H04W 84/20; H04W 74/0866; H04W 40/24; H04W 52/0251; H04W 16/16; H04W 68/12; H04W 48/16
See application file for complete search history.

(56) References Cited

U.S. PATENT DOCUMENTS

| | | | |
|---|---|---|---|
| 2015/0215965 A1* | 7/2015 | Yamada | H04W 36/0069 370/329 |
| 2016/0044744 A1 | 2/2016 | Lee et al. | |
| 2016/0127961 A1 | 5/2016 | Wang et al. | |
| 2016/0174281 A1* | 6/2016 | Wen | H04W 76/15 370/329 |
| 2016/0212790 A1 | 7/2016 | Fujishiro et al. | |
| 2016/0219604 A1 | 7/2016 | Fujishiro et al. | |
| 2016/0338136 A1* | 11/2016 | Zhang | H04W 76/19 |
| 2016/0373975 A1 | 12/2016 | Xu et al. | |
| 2017/0019945 A1* | 1/2017 | Chiba | H04W 76/15 |
| 2018/0035339 A1* | 2/2018 | Mitsui | H04W 72/04 |
| 2018/0124647 A1 | 5/2018 | Dai et al. | |
| 2019/0166576 A1* | 5/2019 | Kim | H04W 52/0206 |
| 2019/0342148 A1* | 11/2019 | Hong | H04W 28/0252 |
| 2020/0037382 A1* | 1/2020 | Xiao | H04W 76/16 |
| 2020/0107390 A1* | 4/2020 | Hwang | H04W 76/16 |

FOREIGN PATENT DOCUMENTS

| | | |
|---|---|---|
| WO | WO 2013/056746 A1 | 4/2013 |
| WO | WO 2014/205711 A1 | 12/2014 |
| WO | WO 2014/209204 A1 | 12/2014 |
| WO | WO 2015/015293 A2 | 2/2015 |
| WO | 2016112970 A1 | 7/2016 |

OTHER PUBLICATIONS

Extended European Search Report for related Application No. 18879306.1; dated Apr. 26, 2021.
Chinese First Office Action Application No. 201711140728.4; dated Jan. 6, 2020.
International Search Report & Written Opinion related to Application No. PCT/CN2018/115040; dated Jan. 30, 2019.
3$^{rd}$ Generation Partnership Project: Technical Specification Group Radio Access Network Evolved Universal Terrestrial Radio Access (E-UTRA) and NR: Multi-connectivity; Stage 2 (Release 15) 3GPP TS 37.340 V1.2.0 (Oct. 31, 2017).
Supplemental Partial European Search Report for related Application No. 18879306.1; dated Dec. 18, 2020.

* cited by examiner

RADIO BARRIER PROCESSING METHOD AND NETWORK DEVICE

CROSS-REFERENCE TO RELATED APPLICATION

The present application is the U.S. national phase of PCT Application No. PCT/CN2018/115040 filed on Nov. 12, 2018, which claims a priority of the Chinese patent application No. 201711140728.4 filed on Nov. 16, 2017, which is incorporated herein by reference in its entirety.

TECHNICAL FIELD

The present disclosure relates to the field of communication technology, in particular to a radio barrier processing method and a network device.

BACKGROUND

At present, in a Long Term Evolution (LTE) system, a Master Node (MN) will establish a Signal Radio Bearer (SRB), such as SRB0, SRB1, SRB2, and other related SRBs. SRB is mainly used to transmit a Radio Resource Control (RRC) message and a Non-Access Stratum (NAS) message, such as a message of transmitting connection setup and releasing of a User Equipment (UE), configuration, and reporting UE measurements, etc.

In a 5-generation New Radio (5G NR) system, similar to the LTE system, Dual Connectivity (DC) functions are introduced. In a LTE DC scenario, only MN will establish an SRB, and in a 5G DC scenario, a Secondary Node (SN) micro base station/small cell can also establish an SRB, such as SRB3. SRB3 is mainly used to transmit some RRC messages Related to SN, such as SN cell measurement and reporting, including reporting to SN and/or MN though SN. Therefore, it is necessary to propose a method of establishing/releasing SRB through SN.

SUMMARY

An object of the present disclosure to provide a radio bearer processing method and a network device to improve the establishment/release of RB by the secondary network device in the 5G system.

In order to solve the above technical problem, embodiments of the present disclosure are implemented as follows.

In one aspect, the present disclosure provides in some embodiments a radio bearer processing method applied for a secondary network device, including: establishing, when a first event is detected, a radio bearer (RB) with a mobile terminal, or refusing to establish the RB; wherein the first event comprises at least one of: the secondary network device being added by a master network device accessed by the mobile terminal, configuration of the secondary network device being changed, or the mobile terminal being switched from another secondary network device to the secondary network device.

In another aspect, the present disclosure provides in some embodiments a radio bearer processing method applied to a secondary network device, including: releasing, when a second event is detected, a radio bearer (RB) from a mobile terminal, or refusing to release the RB, wherein the second event comprises at least one of: the secondary network device being released by the master network device accessed by the mobile terminal, the configuration of the secondary network device being changed, and the mobile terminal being switched from the secondary network device to another secondary network device.

In yet another aspect, the present disclosure provides in some embodiments a network device, wherein the network device is a second network device of a mobile terminal, the network device includes: an establishing module, configured to establish an RB with the mobile terminal when a first event is detected, or refuse to establish the RB, the first event comprises at least one of: the secondary network device is added by the master network device accessed by the mobile terminal, configuration of the secondary network device is changed, and the mobile terminal is switched from another secondary network device to the secondary network device.

In still yet another aspect, the present disclosure provides in some embodiments a network device, wherein the network device is a secondary network device of a mobile terminal, the network device includes: a release module, configured to release a RB from the mobile terminal when a second event is detected, or refuse to release the RB, wherein the second event includes at least one of: the secondary network device being released by the master network device accessed by the mobile terminal, configuration of the secondary network device being changed, and the mobile terminal being switched from the secondary network device to another secondary network device.

In still yet another aspect, the present disclosure provides in some embodiments a network device, including a memory, a processor, and a computer program stored in the memory and executed by the processor, wherein the processor is configured to execute the computer program so as to implement the radio bearer processing method.

In still yet another aspect, the present disclosure provides in some embodiments a computer-readable storage medium storing therein a computer program, wherein the computer program is executed by a processor so as to implement the radio bearer processing method.

In the embodiments of the present disclosure, when it is detected that the secondary network device is added by the master network device accessed by the mobile terminal, the secondary network device is released by the master network device, configuration of the secondary network device is changed, the mobile terminal is switched from the another secondary network device to the secondary network device or from the secondary network device to another secondary network device, the secondary network device establishes or refuses to establish the RB with the mobile terminal, or releases or refuses to release the RB from the mobile terminal. Therefore, in a dual-connection scenario (accessing the secondary network device and the master network device simultaneously) in the 5G system, the secondary network device may be used to establish or refuse to establish, release or refuse to release RB, so as to implement the RB establishment/release scheme in the 5G system.

BRIEF DESCRIPTION OF THE DRAWINGS

In order to more clearly describe the technical solutions of embodiments of the present disclosure or the related art, the drawings used in the description of the embodiments or the related art will be briefly introduced below. Obviously, the drawings in the following description are merely some embodiments. For a person skilled in the art, other drawings can be obtained based on these drawings without creative work.

DETAILED DESCRIPTION

In the following, the technical solutions in the embodiments of the present disclosure will be clearly and completely described with reference to the drawings. Obviously, the described embodiments are part of embodiments of the present disclosure, but not all of them. Based on the embodiments of the present disclosure, all other embodiments obtained by a person skilled in the art without creative work shall fall within the protection scope of the present disclosure.

The technical solution of the present disclosure can be applied to various communication systems, such as: a Global System of Mobile communication (GSM) system, a Code Division Multiple Access (CDMA) system, and a Wideband Code Division Multiple (WCDMA) system, a General Packet Radio Service (GPRS) system, a Long Term Evolution (LTE) system and a New Radio (NR) system, etc.

A mobile terminal is also known as a UE, a access terminal, a user unit, a user station, a mobile station, a remote station, a remote terminal, a mobile device, a user terminal, a terminal, a wireless communication equipment, a user agent, or a user device. An access terminal can be a cellular phone, a cordless phone, a Session Initiation Protocol (SIP) phone, a Wireless Local Loop (WLL) station, a Personal Digital Assistant (PDA), a handheld device having wireless communication functions, a computing device, or other processing devices connected to wireless modems, a vehicle-mounted device, a wearable device, a terminal device in a future 5G network or in a future evolved Public Land Mobile Network (PLMN) networks.

A network device may be a device for communicating with a mobile device, and the network device may be a Base Transceiver Station (BTS) in the GSM system or the CDMA system, or a NodeB (NB) in the WCDMA system, or an eNB or Evolutional Node B (eNodeB) in the LTE system or an access point, or a vehicle-mounted equipment, a wearable equipment, a network-side equipment in the future 5G network, or a network equipment in the future evolved PLMN network.

Figure 1:
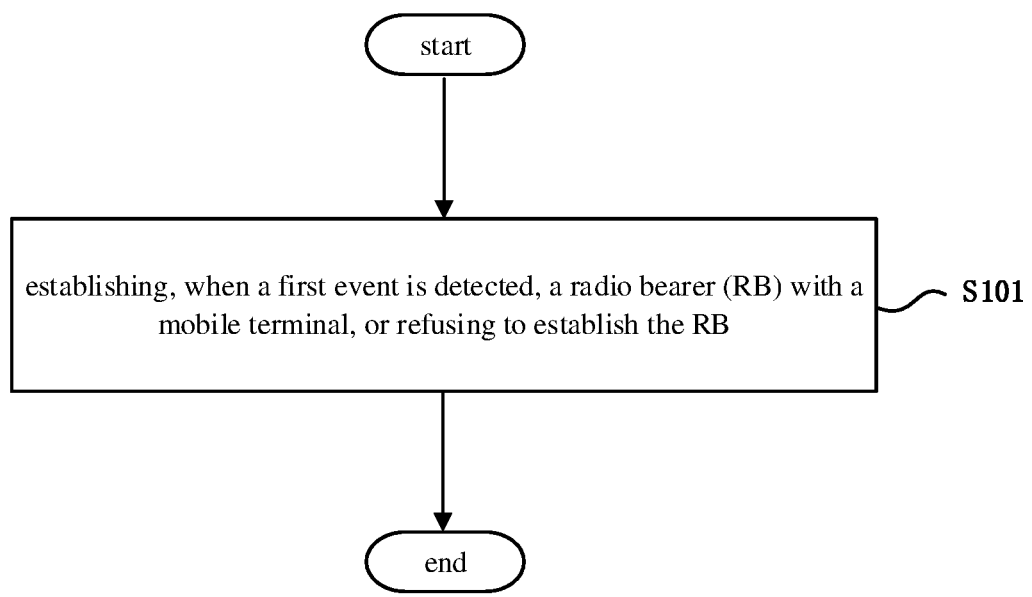
FIG. 1 is a flowchart of a radio bearer processing method according to an embodiment of the present disclosure.

FIG. 1 is a flowchart of a radio bearer processing method according to an embodiment of the present disclosure. The method in FIG. 1 is applied to a secondary network device and may include: S101, establishing, when a first event is detected, a radio bearer (RB) with a mobile terminal, or refusing to establish the RB.

The first event includes at least one of the following: the secondary network device is added by a master network device accessed by the mobile terminal, the configuration of the secondary network device is changed, and the mobile terminal is switched from another secondary network device to the secondary network device.

It can be known that no matter what event occurs in the first event, the mobile terminal is simultaneously served by the secondary network device and the master network device. Therefore, the radio bearer processing method in this embodiment can be applied to a dual-connection scenario.

In the embodiment of the present disclosure, the RB may include a signaling radio bearer (SRB) and/or a data radio bearer (DRB).

The secondary network device being added by a master network device accessed by the mobile terminal means that the master network device accessed by the mobile terminal transmits an instruction to the secondary network device to instruct the secondary network device to serve the mobile terminal. That is, after the secondary network device is added by the master network device accessed by the mobile terminal, the master network device and the secondary network device serve the mobile terminal simultaneously.

The configuration of the secondary network device includes configuration of resources that can serve the mobile terminal after the secondary network device is added by the master network device.

In the embodiment of the present disclosure, the secondary network device can establish or refuse to establish the RB with the mobile terminal when one of following conditions occurs that the secondary network device is added by the master network device accessed by the mobile terminal, the configuration of the secondary network device is changed, and the mobile terminal is switched from another secondary network device to the secondary network device. In a dual-connection scenario (accessing the secondary network device and the master network device simultaneously) in the 5G system, the secondary network device may be used to establish or refuse to establish RB, so as to implement the RB establishment scheme in the 5G system.

The method shown in FIG. 1 will be further described as follows.

In one embodiment, the secondary network device may establish an RB with the mobile terminal in any one of the following three conditions, which are A1-A3.

Condition A1: the secondary network device autonomously triggers the establishment of an RB with the mobile terminal.

Condition A2: the secondary network device receives an instruction/request information from the master network device or another secondary network device, and the instruction/request information is used to instruct or request the secondary network device to establish the RB with the mobile terminal, and then establish the RB with the mobile terminal based on the instruction/request information.

For example, when the secondary network device is added by the master network device accessed by the mobile terminal, the master network device may transmit the instructions/request information to the secondary network device to instruct or request the secondary network device to establish the RB with the mobile terminal. When the mobile terminal is switched from another secondary network device to the secondary network device, the other secondary network device may transmit the indication/request information to the secondary network device to instruct or request the secondary network device to establish the RB with the mobile terminal.

For the instruction/request information transmitted by the master network device or the other secondary network device, the secondary network device may accept the instruction/request information and establish the RB with the mobile terminal based on the instruction/request information. The secondary network device may also reject the indication/request information, that is, refuse to establish the RB with the mobile terminal.

When the master network device or the other secondary network device transmits the instruction/request information to the secondary network device to instruct or request the secondary network device to establish the RB with the mobile terminal, the instruction/request information may include sub-instructions for indicating at least one of the following: a RRC message which needs to be transmitted to the mobile terminal by the secondary network device through the RB, and a RRC message which needs to be reported by the mobile terminal through the RB.

Condition A3: the secondary network device receives the instruction/request information transmitted directly by the mobile terminal, or by the mobile terminal through the master network device or the other secondary network device, the instruction/request information is used to instruct or request the secondary network device to establish the RB with the mobile terminal, and then establish the RB with the mobile terminal based on the instruction/request information.

For example, when the configuration of the secondary network device is changed, the mobile terminal may directly transmit the instruction/request information to the secondary network device to instruct or request the secondary network device to establish the RB with the mobile terminal. When the secondary network device is added by the master network device accessed by the mobile terminal, the mobile terminal can transmit the instruction/request information to the secondary network device through the master network device to instruct or request the secondary network device to establish the RB with the mobile terminal. When the mobile terminal is switched from another secondary network device to the secondary network device, the mobile terminal may transmit the instruction/request message to the secondary network device through the other secondary network device to instruct or request the secondary network device to establish the RB with the mobile terminal.

For the instruction/request information transmitted directly by the mobile terminal, through the master network device, or through the other secondary network device, the secondary network device may accept the instruction/request information and establish the RB with the mobile terminal based on the instruction/request information. The secondary network device may also reject the indication/request information, that is, refuse to establish the RB with the mobile terminal.

When the mobile terminal directly, through the master network device or through the other secondary network device, transmits the instruction/request information to the secondary network device to instruct or request the secondary network device to establish the RB with the mobile terminal, the instruction/request information may include sub-instructions used to indicate at least one of the following: a RRC message which needs to be transmitted to the mobile terminal by the secondary network device through the RB, and a RRC message which needs to be reported by the mobile terminal through the RB.

In one embodiment, after the secondary network device establishes the RB with the mobile terminal, the secondary network device may transmit instruction information to the master network device or the other secondary network device to indicate that the RB has been established. The instruction information includes sub-instruction information used to indicate at least one of the following: a RRC message which needs to be transmitted to the mobile terminal by the secondary network device through the RB, and a RRC message which needs to be reported by the mobile terminal through the RB.

In one embodiment, after the secondary network device establishes the RB with the mobile terminal, it may transmit configuration information of the RRC message to the mobile terminal, the configuration information is used to indicate at least one of the following: a RRC message which needs to be transmitted to the mobile terminal by the secondary network device through the RB, and a RRC message which needs to be reported by the mobile terminal through the RB.

In one embodiment, after the secondary network device establishes the RB with the mobile terminal, the configuration information transmitted to the mobile terminal may further include sub-instructions information for instructing the mobile terminal to, when it is determined a failure event related to the RB and/or a Secondary Cell Group (SCG) occurs, perform one of the following: after the failure event is recovered, reporting an RRC message that needs to be reported by the mobile terminal through the recovered RB; reporting an RRC message that needs to be reported by the mobile terminal through other RBs in SCG where no failure event occurs; reporting an RRC message that needs to be reported by the mobile terminal through the RB to the master network device; reporting an RRC message that needs to be reported by the mobile terminal through the RB to a network device (including the master network device accessed by the mobile terminal and other network devices) corresponding to a Master Cell Group (MCG); and discarding an RRC message that needs to be reported by the mobile terminal through the RB.

Among them, failure events related to the RB include: RB establishment failure, RB failure to transmit certain instruction information, etc. Failure events related to SCG includes a micro cell in SCG failure to transmit instruction information, etc.

In one embodiment, after the secondary network device establishes the RB with the mobile terminal, the master network device may transmit instruction information to the secondary network device to instruct the secondary network device to transmit configuration information to the mobile terminal, where the configuration information is used to indicate the mobile terminal to, when it is determined a failure event related to the RB and/or SCG occurs, perform one of the following: after the failure event is recovered, reporting an RRC message that needs to be reported by the mobile terminal through the recovered RB; reporting an RRC message that needs to be reported by the mobile terminal through other RBs in SCG where no failure event occurs; reporting an RRC message that needs to be reported by the mobile terminal through the RB to the master network device; reporting an RRC message that needs to be reported by the mobile terminal through the RB to a network device (including the master network device accessed by the mobile terminal and other network devices) corresponding to MCG; and discarding an RRC message that needs to be reported by the mobile terminal through the RB.

Among them, failure events related to the RB include: RB establishment failure, RB failure to transmit certain instruction information, etc. Failure events related to SCG includes a micro cell in SCG failure to transmit instruction information, etc.

Figure 2:
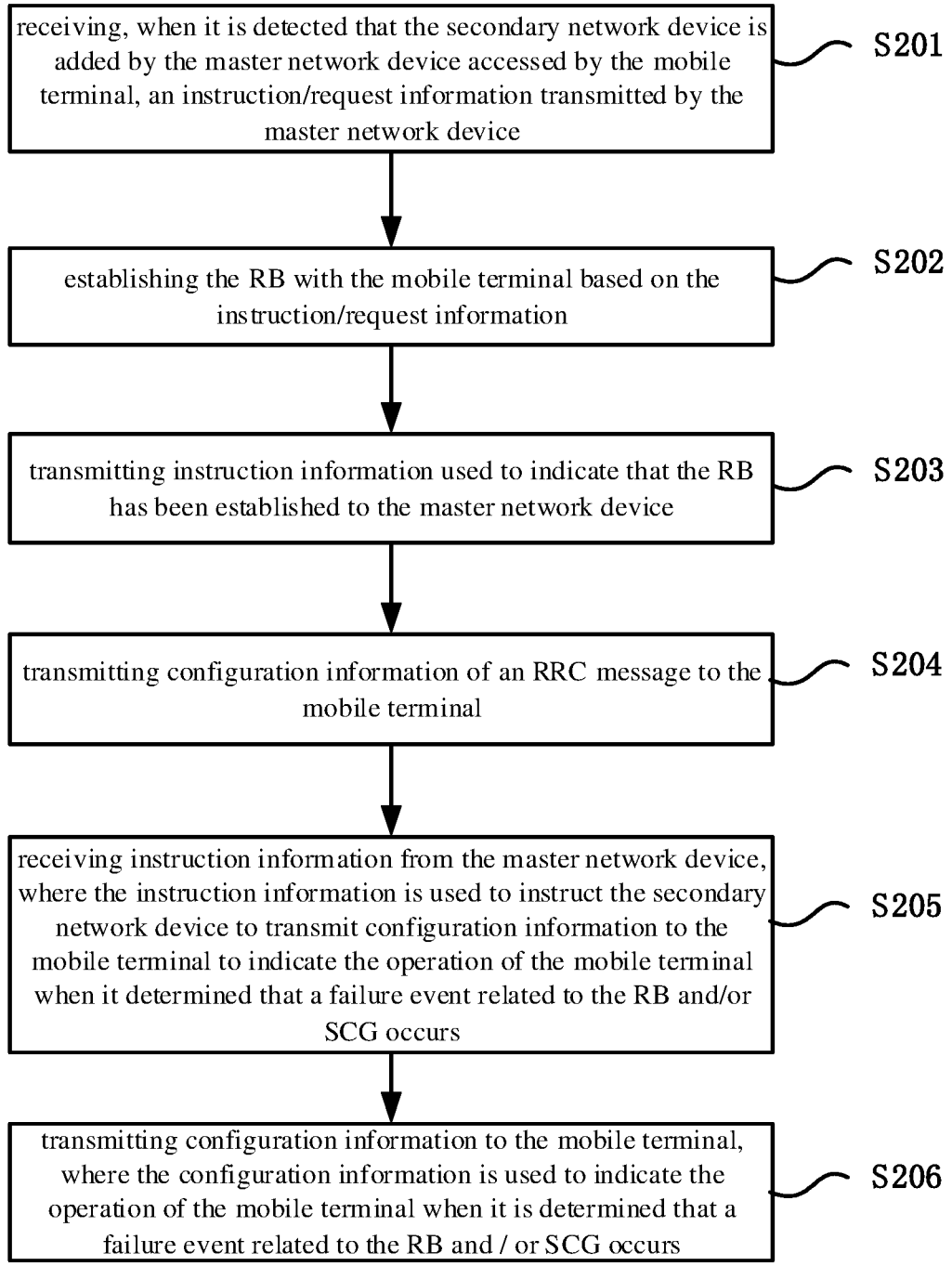
FIG. 2 is another flowchart of a radio bearer processing method according to an embodiment of the present disclosure.

FIG. 2 is a flowchart of a radio bearer processing method according to an embodiment of the present disclosure. The method in FIG. 2 is applied to a secondary network device and may include the following steps.

S201: receiving, when it is detected that the secondary network device is added by the master network device accessed by the mobile terminal, an instruction/request information transmitted by the master network device.

In this step, the instruction/request information is used to instruct or request the secondary network device to establish the RB with the mobile terminal, and the instruction/request information includes sub-instruction information used to indicate at least one of the following messages: a RRC message which needs to be transmitted to the mobile terminal by the secondary network device through the RB, and a RRC message which needs to be reported by the mobile terminal through the RB.

The secondary network device being added by a master network device accessed by the mobile terminal means that the master network device accessed by the mobile terminal transmits an instruction to the secondary network device to instruct the secondary network device to serve the mobile terminal. That is, after the secondary network device is added by the master network device accessed by the mobile terminal, the master network device and the secondary network device serve the mobile terminal simultaneously.

S202: establishing the RB with the mobile terminal based on the instruction/request information.

S203: transmitting instruction information used to indicate that the RB has been established to the master network device.

In this step, the instruction information includes sub-instruction information for indicating at least one of the following messages: a RRC message which needs to be transmitted to the mobile terminal by the secondary network device through the RB, and a RRC message which needs to be reported by the mobile terminal through the RB.

S204: transmitting configuration information of an RRC message to the mobile terminal.

In this step, the configuration information of the RRC message is used to indicate the RRC message that needs to be reported by the mobile terminal through the RB and the RRC message that needs to be reported by the mobile terminal to the main network device.

S205: receiving instruction information from the master network device, where the instruction information is used to instruct the secondary network device to transmit configuration information to the mobile terminal to indicate the operation of the mobile terminal when it determined that a failure event related to the RB and/or SCG occurs.

Among them, failure events related to the RB include: RB establishment failure, RB failure to transmit certain instruction information, etc. Failure events related to SCG includes a micro cell in SCG failure to transmit instruction information, etc.

In this step, when it is determined a failure event related to the RB and/or SCG occurs, the mobile terminal performs one of the following: reporting an RRC message that needs to be reported by the mobile terminal through the recovered RB; reporting an RRC message that needs to be reported by the mobile terminal through other RBs in SCG where no failure event occurs; reporting an RRC message that needs to be reported by the mobile terminal through the RB to the master network device; reporting an RRC message that needs to be reported by the mobile terminal through the RB to a network device corresponding to MCG; and discarding an RRC message that needs to be reported by the mobile terminal through the RB.

S206: transmitting configuration information to the mobile terminal, where the configuration information is used to indicate the operation of the mobile terminal when it is determined that a failure event related to the RB and/or SCG occurs.

In this embodiment, the secondary network device establishes the RB with the mobile terminal when it is detected that the secondary network device is added by the master network device accessed by the mobile terminal, In another embodiment, the secondary network device establishes the RB with the mobile terminal when it is detected that configuration of the secondary network device is changed or the mobile terminal is switched from another secondary network device to the secondary network device. The specific process of establishing the RB is similar to this embodiment, and therefore will not be described in detail.

In this embodiment, after the secondary network device establishes the RB with the mobile terminal, the master network device may transmit instruction information to the secondary network device to instruct the secondary network device to transmit configuration information to the mobile terminal, where the configuration information is used to, when it is determined a failure event related to the RB and/or SCG occurs, indicate the operation of the mobile terminal. In another embodiment, after the secondary network device establishes the RB with the mobile terminal, it can autonomously configure configuration information used to indicate the operation of the mobile terminal when it is determined that a failure event related to the RB and/or SCG occurs. In this case, the operation of the mobile terminal when it is determined that a failure event related to RB and/or SCG occurs is the same as this embodiment.

In this embodiment, after receiving the instruction/request information from the master network device, the secondary network device agrees to establish the RB with the mobile terminal. In another embodiment, after receiving the instruction/request information from the master network device, the secondary network device refuse to establish the RB with the mobile terminal.

In this embodiment, the secondary network device may be a Secondary Node (SN, a micro base station/small base station), and the master network device may be a Master Node (MN).

In this embodiment, when it is detected that the secondary network device is added by the master network device accessed by the mobile terminal, the secondary network device establishes the RB with the mobile terminal, so that in the dual-connection scenario (accessing the secondary network device and the master network device simultaneously) of the 5G system, the auxiliary network equipment can be used to establish or refuse to establish the RB, so as to implement the RB establishment scheme in the 5G system.

Figure 3:
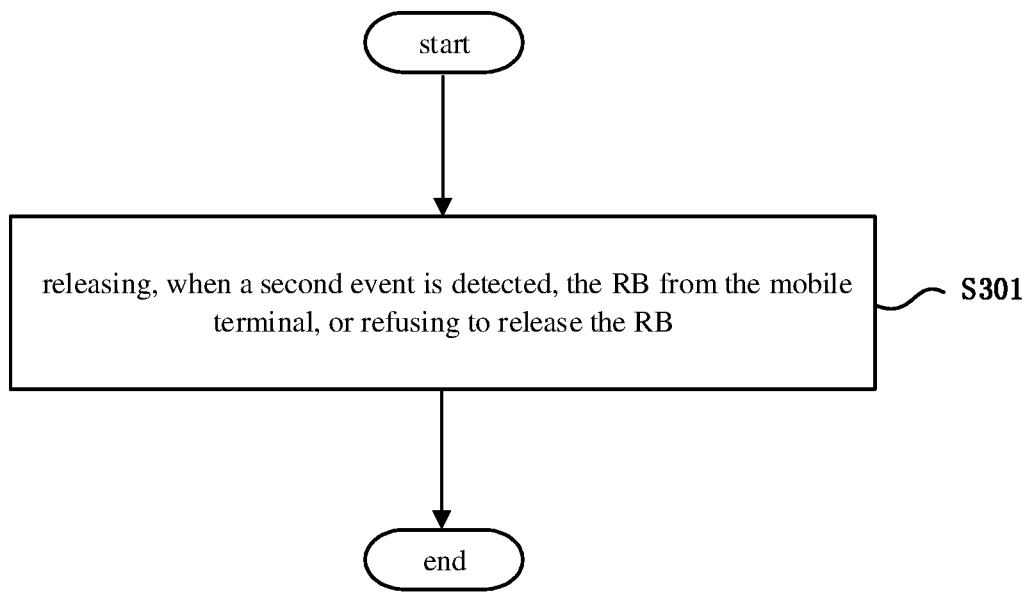
FIG. 3 is yet another flowchart of a radio bearer processing method according to an embodiment of the present disclosure.

FIG. 3 is a flowchart of a radio bearer processing method a according to an embodiment of the present disclosure. The method in FIG. 3 is applied to a secondary network device and may include: S301: releasing, when a second event is detected, the RB from the mobile terminal, or refusing to release the RB.

The second event includes at least one of the following: the secondary network device is released by the master network device accessed by the mobile terminal, the configuration of the secondary network device is changed, and the mobile terminal is switched from the secondary network device to another secondary network device.

In the embodiment of the present disclosure, the RB may include SRB and/or DRB.

The releasing the secondary network device by the master network device accessed by the mobile terminal means that the master network device accessed by the mobile terminal transmits an instruction to the secondary network device to indicate that the secondary network device no longer serves the mobile terminal. That is, after the secondary network device is released by the master network device accessed by the mobile terminal, the secondary network device no longer serves the mobile terminal.

The configuration of the secondary network device includes the configuration of the resources that serve the mobile terminal before the secondary network device is released by the master network device.

In the embodiment of the present disclosure, the secondary network device can release or refuse to release the RB from the mobile terminal when one of following conditions occurs that the secondary network device is released by the master network device accessed by the mobile terminal, the configuration of the secondary network device is changed, and the mobile terminal is switched from the secondary network device to another secondary network device. In a dual-connection scenario (accessing the secondary network device and the master network device simultaneously) in the 5G system, the secondary network device may be used to release or refuse to release RB, so as to implement the RB release scheme in the 5G system.

Hereinafter, the method shown in FIG. 3 will be further described in combination with specific embodiments.

In one embodiment, the secondary network device may release the RB from the mobile terminal in any of the following three conditions, B1-B3.

Condition B1: The secondary network device autonomously triggers the release of the RB from the mobile terminal.

Condition B2: the secondary network device receives an instruction/request information from the master network device or another secondary network device, and the instruction/request information is used to instruct or request the secondary network device to release the RB from the mobile terminal, and then release the RB from mobile terminals.

For example, when the secondary network device is released by the master network device accessed by the mobile terminal, the master network device may transmit an instruction/request information to the secondary network device to instruct or request the secondary network device to release the RB from the mobile terminal; when the mobile terminal is switched from the secondary network device to another secondary network device, the other secondary network device may transmit an instruction/request information to the secondary network device to instruct or request the secondary network device to release the RB from the mobile terminal.

For the instruction/request information transmitted by the master network device or the other secondary network device, the secondary network device may accept the instruction/request information and release the RB from the mobile terminal based on the instruction/request information. The secondary network device may also reject the instruction/request information, that is, refuse to release the RB from the mobile terminal.

Condition B3: the secondary network device receives the instruction/request information transmitted directly by the mobile terminal, or by the mobile terminal through the master network device or the other secondary network device, the instruction/request information is used to instruct or request the secondary network device to release the RB from the mobile terminal, and then release the RB from the mobile terminal based on the instruction/request information.

For example, when the configuration of the secondary network device is changed, the mobile terminal may directly transmit the instruction/request information to the secondary network device to instruct or request the secondary network device to release the RB from the mobile terminal. When the secondary network device is released by the master network device accessed by the mobile terminal, the mobile terminal can transmit the instruction/request information to the secondary network device through the master network device to instruct or request the secondary network device to release the RB from the mobile terminal. When the mobile terminal is switched from the secondary network device to another secondary network device, the mobile terminal may transmit the instruction/request information to the secondary network device through the other secondary network device to instruct or request the secondary network device to release the RB from the mobile terminal.

For the instruction/request information transmitted directly by the mobile terminal, through the master network device, or through the other secondary network device, the secondary network device may accept the instruction/request information and release the RB from the mobile terminal based on the instruction/request information. The secondary network device may also reject the indication/request information, that is, refuse to release the RB from the mobile terminal.

In one embodiment, after the secondary network device releases the RB from the mobile terminal, the secondary network device may transmit indication information to the master network device or the other secondary network device to indicate that the RB has been released.

In one embodiment, after the secondary network device releases the RB from the mobile terminal, the secondary network device may transmit configuration information of the RRC message to the mobile terminal, and the configuration information is used to indicate a RRC message that needs to be reported by the mobile terminal to the master network device, or a RRC message that needs to be discarded.

Figure 4:
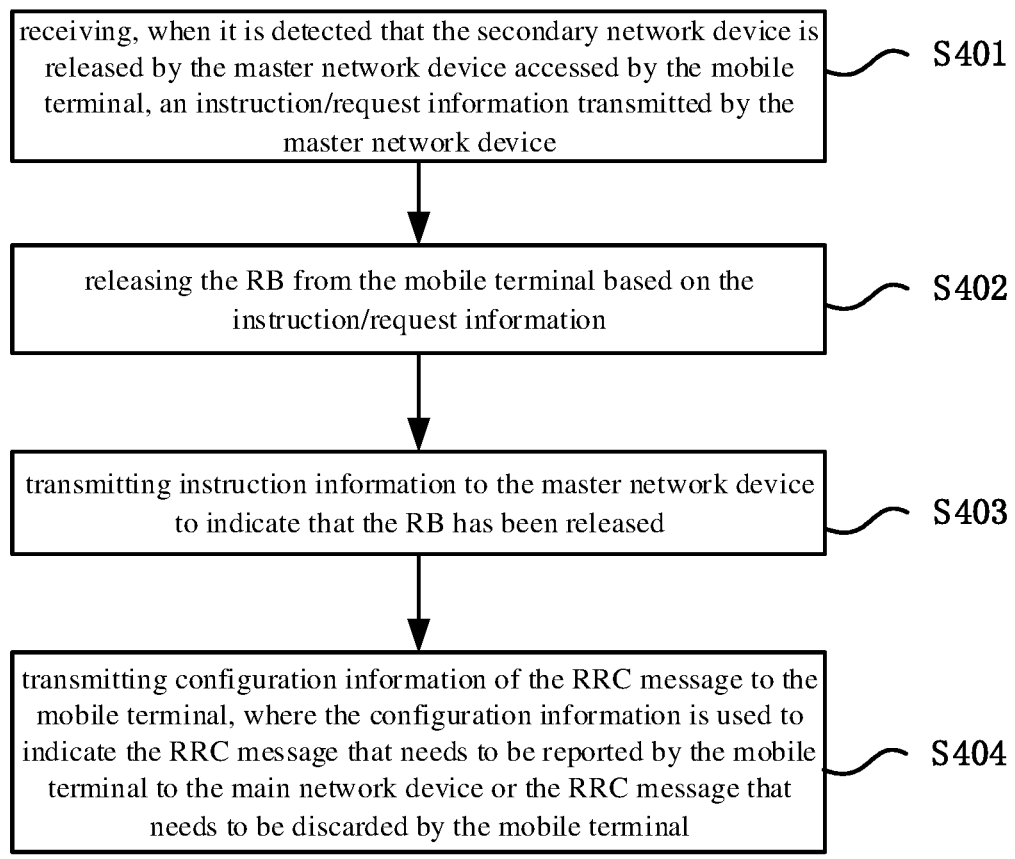
FIG. 4 is still yet another flowchart of a radio bearer processing method according to an embodiment of the present disclosure.

FIG. 4 is a flowchart of a radio bearer processing method according to an embodiment of the present disclosure. The method in FIG. 4 is applied to a secondary network device and may include the following steps.

S401: receiving, when it is detected that the secondary network device is released by the master network device accessed by the mobile terminal, an instruction/request information transmitted by the master network device.

In this step, the indication/request information is used to instruct or request the secondary network device to release the RB from the mobile terminal.

The secondary network device being released by the master network device accessed by the mobile terminal means that the master network device accessed by the mobile terminal transmits an instruction to the secondary network device to indicate that the secondary network device no longer serves the mobile terminal. That is, after the secondary network device is released by the master network device accessed by the mobile terminal, the secondary network device no longer serves the mobile terminal.

S402: releasing the RB from the mobile terminal based on the instruction/request information.

S403: transmitting instruction information to the master network device to indicate that the RB has been released.

S404: transmitting configuration information of the RRC message to the mobile terminal, where the configuration information is used to indicate the RRC message that needs to be reported by the mobile terminal to the main network device or the RRC message that needs to be discarded by the mobile terminal.

In this embodiment, the secondary network device release an RB from the mobile terminal when it is detected that the secondary network device is released by the master network device accessed by the mobile terminal. In another embodiment, the secondary network device releases the RB from the mobile terminal when it is detected that the configuration of the secondary network device is changed or the mobile terminal is switched from the secondary network device to another secondary network device. The specific process of releasing the RB is similar to this embodiment, so it is not described in detail.

In this embodiment, after receiving the instruction/request information from the master network device, the secondary network device agrees to release the RB from the mobile terminal. In another embodiment, after receiving the instruction/request information from the master network device, the secondary network device refuse to release the RB from the mobile terminal.

In this embodiment, the secondary network device may be a Secondary Node (SN, a micro base station/small base station), and the master network device may be a MN.

In this embodiment, when the secondary network device detects that the secondary network device is released by the master network device accessed by the mobile terminal, it releases the RB from the mobile terminal, so that in the dual-connection scenario (accessing the secondary network device and the master network device simultaneously) of the 5G system, the auxiliary network equipment can be used to release or refuse to release the RB, so as to implement the RB release scheme in the 5G system.

The specific embodiments of the present specification have been described above. Other embodiments are within the scope of the following claims. In some cases, the actions or steps recited in the claims may be performed in a different order than in the embodiments and the desired result may still be achieved. In addition, the processes shown in the drawings do not necessarily require a particular order or a sequential order to achieve the desired results. In some embodiments, multi-tasks processing and parallel processing are also possible or may be advantageous.

Figure 5:
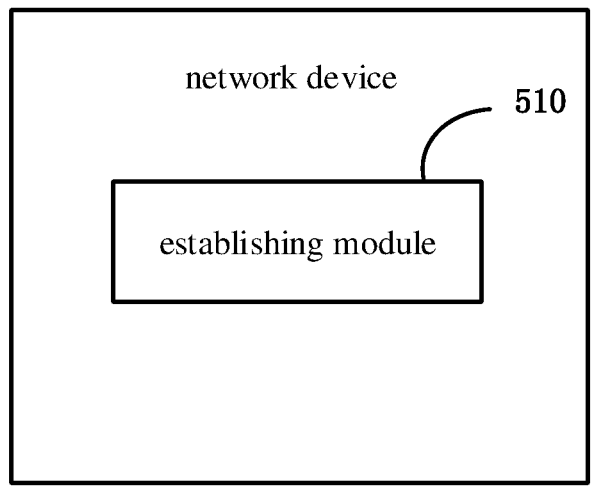
FIG. 5 is a schematic structural diagram of a radio bearer processing apparatus according to an embodiment of the present disclosure.

FIG. 5 is a schematic structural diagram of a network device according to an embodiment of the present disclosure. Referring to FIG. 5, a network device is a secondary network device of a mobile terminal, which may include: an establishing module 510, configured to establish an RB with the mobile terminal when the first event is detected, or refuse to establish the RB. The first event includes at least one of the following: the secondary network device is added by the master network device accessed by the mobile terminal, the configuration of the secondary network device is changed, and the mobile terminal is switched from another secondary network device to the secondary network device.

In one embodiment, the establishment module 510 includes: a first receiving unit, configured to receive first information from the master network device, another secondary network device, the mobile terminal through the master network device or the other secondary network device, the first information is used to instruct or request the secondary network device to establish the RB with the mobile terminal; and an establishing unit, configured to establish the RB with the mobile terminal based on the first information.

In one embodiment, the first information includes first sub-instruction information, and the first sub-instruction information is used to indicate at least one of the following: an RCC message that needs to be transmitted by the secondary network device to the mobile terminal through the RB; an RCC message that needs to be reported by the mobile terminal through the RB.

In one embodiment, the network device further includes: a first transmitting module, configured to, after establishing the RB with the mobile terminal, transmit first indication information to the master network device or the other secondary network device to indicate that the RB has been established. The first indication information includes second sub-indication information used to indicate at least one of the following: an RRC message that needs to be transmitted by the secondary network device to the mobile terminal through the RB, and an RRC message that needs to be reported by the mobile terminal through the RB.

In one embodiment, the network device further includes: a second transmitting module, configured to transmit the first configuration information of the RRC message to the mobile terminal after establishing the RB with the mobile terminal. The first configuration information is used to indicate at least one of the following: an RRC message that needs to be reported by the mobile terminal through the RB; and an RRC message that needs to be reported by the mobile terminal to the master network device.

In one embodiment, the first configuration information further includes third sub-instruction information, and the third sub-instruction information is used to instruct the mobile terminal to, when it is determined a failure event related to the RB and/or a Secondary Cell Group (SCG) occurs, perform one of the following: after the failure event is recovered, reporting an RRC message that needs to be reported by the mobile terminal through the recovered RB; reporting an RRC message that needs to be reported by the mobile terminal through other RBs in SCG where no failure event occurs; reporting an RRC message that needs to be reported by the mobile terminal through the RB to the master network device; reporting an RRC message that needs to be reported by the mobile terminal through the RB to a network device corresponding to a Master Cell Group (MCG); and discarding an RRC message that needs to be reported by the mobile terminal through the RB.

In one embodiment, the network device further includes: a receiving module, configured to receive the second instruction information from the main network device after establishing the RB with the mobile terminal; a third transmitting module, configured to transmit the second configuration information to the mobile terminal based on the second instruction message, the second configuration information is used to instruct the mobile terminal to, when it is determined a failure event related to the RB and/or a Secondary Cell Group (SCG) occurs, perform one of the following: after the failure event is recovered, reporting an RRC message that needs to be reported by the mobile terminal through the RB; reporting an RRC message that needs to be reported by the mobile terminal through other RBs in SCG where no failure event occurs; reporting an RRC message that needs to be reported by the mobile terminal through the RB to the master network device; reporting an RRC message that needs to be reported by the mobile terminal through the RB to a network device corresponding to a Master Cell Group (MCG); and discarding an RRC message that needs to be reported by the mobile terminal through the RB.

In one embodiment, the RB includes SRB and/or DRB.

The network device provided in the embodiment of the present disclosure can implement the processes implemented by the secondary network device in the method of FIG. 1 to FIG. 2, which will not be repeated herein.

In the embodiment of the present disclosure, the secondary network device can establish or refuse to establish the RB with the mobile terminal when one of following conditions occurs that the secondary network device is added by the master network device accessed by the mobile terminal, the configuration of the secondary network device is changed, and the mobile terminal is switched from another secondary network device to the secondary network device. In a dual-connection scenario (accessing the secondary network device and the master network device simultaneously) in the 5G system, the secondary network device may be used to establish or refuse to establish RB, so as to implement the RB establishment scheme in the 5G system.

Figure 6:
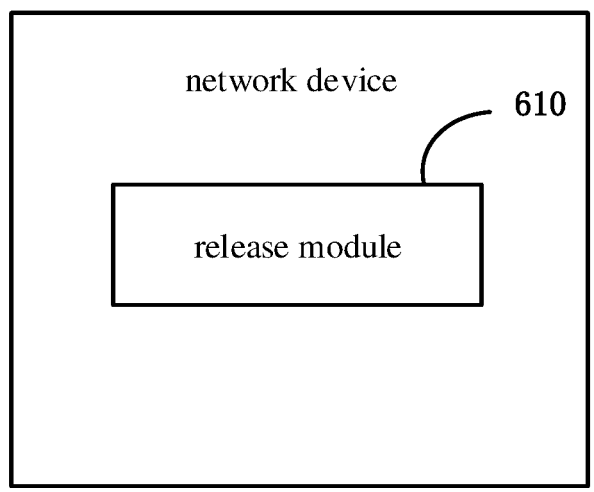
FIG. 6 is another schematic structural diagram of a radio bearer processing apparatus according to an embodiment of the present disclosure.

FIG. 6 is a schematic structural diagram of a network device according to an embodiment of the present disclosure. Referring to FIG. 6, the network device is a secondary network device of a mobile terminal, which may include: a release module 610, configured to release the RB from the mobile terminal when a second event is detected, or refuse to release the RB. The second event includes at least one of the following: the secondary network device is released by the master network device accessed by the mobile terminal, the configuration of the secondary network device is changed, and the mobile terminal is switched from the secondary network device to another secondary network device.

In one embodiment, the release module 610 includes: a second receiving unit, configured to receive second information from the master network device, another secondary network device, the mobile terminal, the mobile terminal through the master network device or the other secondary network device, the second information is used to instruct or request the secondary network device to release the RB from the mobile terminal; and a release unit, configured to release the RB from the mobile terminal based on the second information.

In one embodiment, the network device further includes: a fourth transmitting module, configured to transmit third instruction information for indicating that the RB has been released to the master network device or the secondary network device after the RB has been released from the mobile terminal.

In one embodiment, the network device further includes: a fifth transmitting module, configured to transmit configuration information of an RRC message to the mobile terminal after the RB is released from the mobile terminal. The configuration information is used to indicate: an RRC message that needs to be reported by the mobile terminal to the main network device; or an RRC messages that needs to be discarded by the mobile terminal.

In one embodiment, the RB includes SRB and/or DRB.

The network device provided in the embodiment of the present disclosure can implement the processes implemented by the secondary network device in the method of FIG. 3 to FIG. 4, which will not be repeated herein.

In the embodiment of the present disclosure, the secondary network device can release or refuse to release the RB from the mobile terminal when one of following conditions occurs that the secondary network device is released by the master network device accessed by the mobile terminal, the configuration of the secondary network device is changed, and the mobile terminal is switched from the secondary network device to another secondary network device. In a dual-connection scenario (accessing the secondary network device and the master network device simultaneously) in the 5G system, the secondary network device may be used to release or refuse to release RB, so as to implement the RB release scheme in the 5G system.

Figure 7:
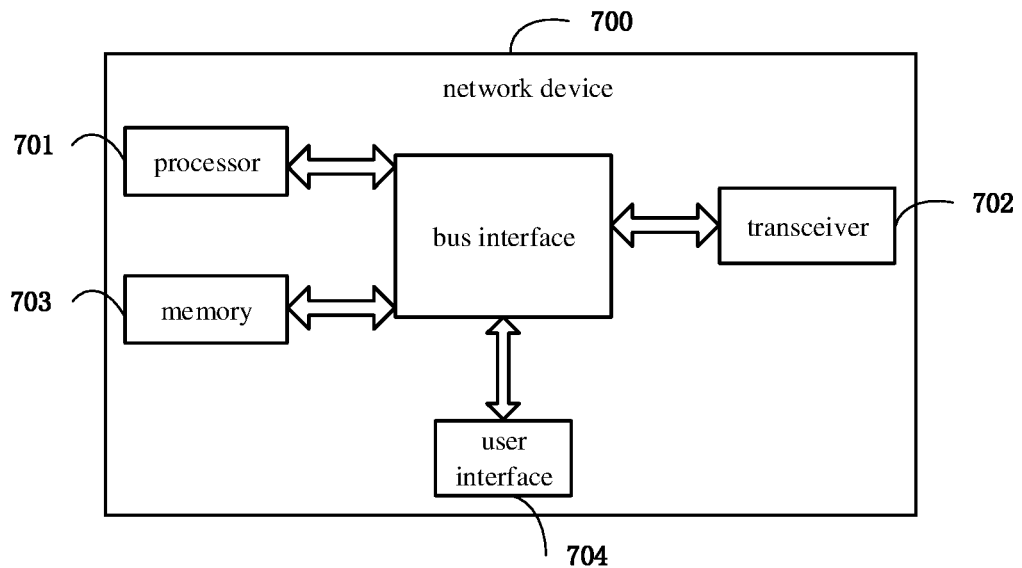
FIG. 7 is a schematic structural diagram of a network device according to an embodiment of the present disclosure.

FIG. 7 is a structural diagram of a network device in an embodiment of the present disclosure, which can implement details of a radio bearer processing method performed by a secondary network device in the foregoing embodiment, and achieve the same effect. As shown in FIG. 7, the network device 700 includes: a processor 701, a transceiver 702, a memory 703, a user interface 704, and a bus interface.

In the embodiment of the present disclosure, the network device 700 further includes: a computer program stored on the memory 703 and executed by the processor 701. When the computer program is executed by the processor 701, the following steps are implemented: establishing an RB with the mobile terminal when the first event is detected, or refusing to establish the RB. The first event includes at least one of the following: the secondary network device is added by the master network device accessed by the mobile terminal, the configuration of the secondary network device is changed, and the mobile terminal is switched from another secondary network device to the secondary network device.

In FIG. 7, the bus architecture may include any number of interconnected buses and bridges, and one or more processors specifically represented by the processor 701 and the memory represented by the memory 703 are linked together. The bus architecture can also link various other circuits such as peripherals, voltage regulators, and power management circuits, which are known in the art and need not to be described herein. The bus interface provides an interface. The transceiver 702 may be multiple elements, including a transmitter and a receiver, providing a unit for communicating with various other devices over a transmission medium. For different user devices, the user interface 704 may also be an interface capable of externally or internally connecting the required devices. The connected devices include, but are not limited to, a keypad, a display, a speaker, a microphone, a joystick, and the like.

The processor 701 is responsible for managing the bus architecture and general processing, and the memory 703 can store data used by the processor 701 to implement operations.

Optionally, when the computer program is executed by the processor 701, the following steps may also be implemented: receiving first information from the master network device, another secondary network device, the mobile terminal, the mobile terminal through the master network device or the other secondary network device, the first information is used to instruct or request the secondary network device to establish the RB with the mobile terminal; and establishing the RB with the mobile terminal based on the first information.

In one embodiment, the first information includes first sub-instruction information, and the first sub-instruction information is used to indicate at least one of the following: an RCC message that needs to be transmitted by the secondary network device to the mobile terminal through the RB; an RCC message that needs to be reported by the mobile terminal through the RB.

Optionally, when the computer program is executed by the processor 701, the following steps may also be implemented: after establishing the RB with the mobile terminal, transmitting first indication information to the master network device or the other secondary network device to indicate that the RB has been established. The first indication information includes second sub-indication information used to indicate at least one of the following: an RRC message that needs to be transmitted by the secondary network device to the mobile terminal through the RB, and an RRC message that needs to be reported by the mobile terminal through the RB.

Optionally, when the computer program is executed by the processor 701, the following steps may also be implemented: transmitting the first configuration information of the RRC message to the mobile terminal after establishing the RB with the mobile terminal. The first configuration information is used to indicate at least one of the following: an RRC message that needs to be reported by the mobile terminal through the RB; and an RRC message that needs to be reported by the mobile terminal to the master network device.

In one embodiment, the first configuration information further includes third sub-instruction information, and the third sub-instruction information is used to instruct the mobile terminal to, when it is determined a failure event related to the RB and/or a Secondary Cell Group (SCG) occurs, perform one of the following: after the failure event is recovered, reporting an RRC message that needs to be reported by the mobile terminal through the recovered RB; reporting an RRC message that needs to be reported by the mobile terminal through other RBs in SCG where no failure event occurs; reporting an RRC message that needs to be reported by the mobile terminal through the RB to the master network device; reporting an RRC message that needs to be reported by the mobile terminal through the RB to a network device corresponding to a Master Cell Group (MCG); and discarding an RRC message that needs to be reported by the mobile terminal through the RB.

Optionally, when the computer program is executed by the processor 701, the following steps may also be implemented: receiving the second instruction information from the main network device after establishing the RB with the mobile terminal; transmitting the second configuration information to the mobile terminal based on the second instruction message, the second configuration information is used to instruct the mobile terminal to, when it is determined a failure event related to the RB and/or a Secondary Cell Group (SCG) occurs, perform one of the following: after the failure event is recovered, reporting an RRC message that needs to be reported by the mobile terminal through the RB; reporting an RRC message that needs to be reported by the mobile terminal through other RBs in SCG where no failure event occurs; reporting an RRC message that needs to be reported by the mobile terminal through the RB to the master network device; reporting an RRC message that needs to be reported by the mobile terminal through the RB to a network device corresponding to a Master Cell Group (MCG); and discarding an RRC message that needs to be reported by the mobile terminal through the RB.

In one embodiment, the RB includes SRB and/or DRB.

In the embodiment of the present disclosure, the secondary network device can establish or refuse to establish the RB with the mobile terminal when one of following conditions occurs that the secondary network device is added by the master network device accessed by the mobile terminal, the configuration of the secondary network device is changed, and the mobile terminal is switched from another secondary network device to the secondary network device. In a dual-connection scenario (accessing the secondary network device and the master network device simultaneously) in the 5G system, the secondary network device may be used to establish or refuse to establish RB, so as to implement the RB establishment scheme in the 5G system.

An embodiment of the present disclosure further provides a network device, including a processor 701, a memory 703, and a computer program stored in the memory 703 and executed by the processor 701. When the computer program is executed by the processor 701, the radio bearer processing method is implemented, and the same technical effects are achieved. The details are not repeated herein.

Figure 8:
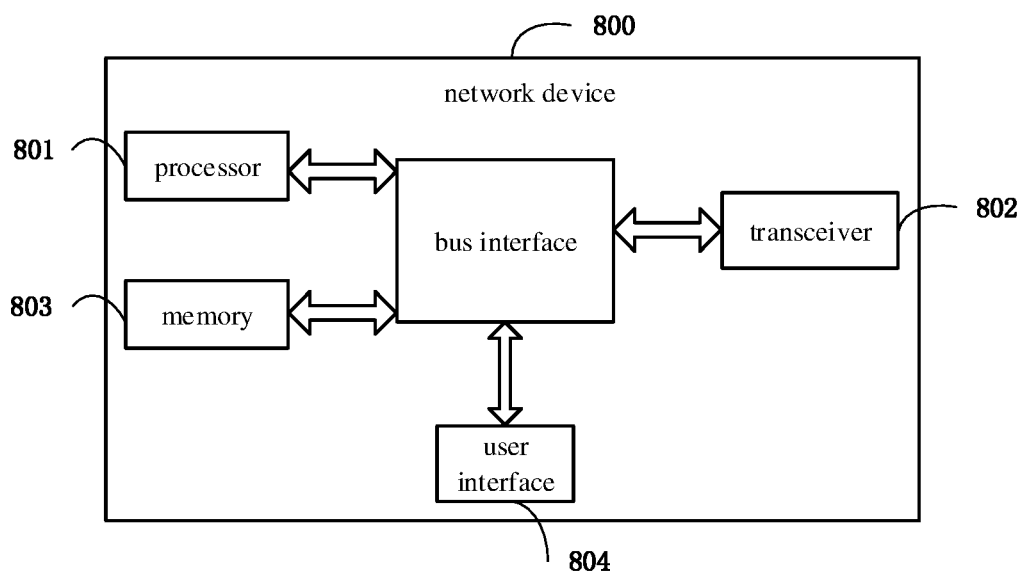
FIG. 8 is another schematic structural diagram of a network device according to an embodiment of the present disclosure.

FIG. 8 is a structural diagram of a network device in an embodiment of the present disclosure, which can implement details of a radio bearer processing method performed by a secondary network device in the foregoing embodiment, and achieve the same effect. As shown in FIG. 8, the network device 800 includes: a processor 801, a transceiver 802, a memory 803, a user interface 804, and a bus interface.

In the embodiment of the present disclosure, the network device 800 further includes a computer program stored on the memory 803 and executed by the processor 801. When the computer program is executed by the processor 801, the following steps are implemented: releasing the RB from the mobile terminal when a second event is detected, or refusing to release the RB. The second event includes at least one of the following: the secondary network device is released by the master network device accessed by the mobile terminal, the configuration of the secondary network device is changed, and the mobile terminal is switched from the secondary network device to another secondary network device.

In FIG. 8, the bus architecture may include any number of interconnected buses and bridges, and one or more processors specifically represented by the processor 801 and the memory represented by the memory 803 are linked together. The bus architecture can also link various other circuits such as peripherals, voltage regulators, and power management circuits, which are known in the art and need not to be described herein. The bus interface provides an interface. The transceiver 802 may be multiple elements, including a transmitter and a receiver, providing a unit for communicating with various other devices over a transmission medium. For different user devices, the user interface 804 may also be an interface capable of externally or internally connecting required devices. The connected devices include, but are not limited to, a keypad, a display, a speaker, a microphone, a joystick, and the like.

The processor 801 is responsible for managing the bus architecture and general processing, and the memory 803 may store data used by the processor 801 to perform operations.

Optionally, when the computer program is executed by the processor 801, the following steps may also be implemented: receiving second information from the master network device, another secondary network device, the mobile terminal, the mobile terminal through the master network device or the other secondary network device, the second information is used to instruct or request the secondary network device to release the RB from the mobile terminal; and releasing the RB from the mobile terminal based on the second information.

Optionally, when the computer program is executed by the processor 801, the following steps may also be implemented: transmitting third instruction information for indicating that the RB has been released to the master network device or the secondary network device after the RB has been released from the mobile terminal.

Optionally, when the computer program is executed by the processor 801, the following steps may also be implemented: transmitting configuration information of an RRC message to the mobile terminal after the RB is released from the mobile terminal. The configuration information is used to indicate: an RRC message that needs to be reported by the mobile terminal to the main network device; or an RRC messages that needs to be discarded by the mobile terminal.

Optionally, the RB includes SRB and/or DRB.

In the embodiment of the present disclosure, the secondary network device can release or refuse to release the RB from the mobile terminal when one of following conditions occurs that the secondary network device is released by the master network device accessed by the mobile terminal, the configuration of the secondary network device is changed, and the mobile terminal is switched from the secondary network device to another secondary network device. In a dual-connection scenario (accessing the secondary network device and the master network device simultaneously) in the 5G system, the secondary network device may be used to release or refuse to release RB, so as to implement the RB release scheme in the 5G system.

Optionally, an embodiment of the present disclosure further provides a network device, including a processor 801, a memory 803, and a computer program stored on the memory 803 and executed by the processor 801. When the computer program is executed by the processor 801, the radio bearer processing method is implemented, and the same technical effects can be achieved. The details are not repeated herein.

An embodiment of the present disclosure further provides a computer-readable storage medium. A computer program is stored on the computer-readable storage medium, and when the computer program is executed by a processor, the foregoing wireless bearer processing method is implemented, and the same Technical effects are achieved. It will not be repeated herein. The computer-readable storage medium is, for example, a read-only memory (ROM), a random access memory (RAM), a magnetic disk or an optical disk.

It should be noted that, in this article, the terms "including", "including" or any other variants thereof are intended to cover non-exclusive inclusion, so that a process, method, article or device including a series of elements includes not only those elements, but also includes other elements not explicitly listed, or elements inherent to such a process, method, article, or device. Without more restrictions, an element limited by the sentence "including a . . . " does not exclude that there are other same elements in the process, method, article, or device.

Through the above embodiments, a person skilled in the art can clearly understand that the methods in the above embodiments can be implemented by software and a necessary universal hardware platform, and of course, also by hardware, but in many cases the former is better. Based on such an understanding, the technical solution of the present disclosure in essence or a part that contributes to the prior art may be embodied in the form of a software product, which is stored in a storage medium (such as ROM/RAM, a magnetic disk, an optical disc). The software product includes a plurality of instructions to make a terminal (which may be a mobile phone, a computer, a server, an air conditioner, or a network device, etc.) to execute the methods described in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A radio bearer processing method applied for a secondary network device, comprising:
    establishing or refusing to establish, when a first event is detected, a signaling radio bearer (SRB) with a mobile terminal;
    wherein the first event comprises at least one of: the secondary network device being added by a master network device accessed by the mobile terminal, configuration of the secondary network device being changed, or the mobile terminal being switched from another secondary network device to the secondary network device;
  wherein the establishing the SRB with a mobile terminal comprises:
    receiving first information from the master network device, the mobile terminal, the mobile terminal through the master network device or the other secondary network device, the first information being used to instruct or request the secondary network device to establish the SRB with the mobile terminal; and
    establishing the SRB with the mobile terminal based on the first information;
  wherein the first information comprises first sub-instruction information, and the first sub-instruction information is used to indicate at least one of: an RRC message that need to be transmitted by the secondary network device to the mobile terminal through the SRB; or an RRC message that needs to be reported by the mobile terminal through the SRB.

2. The radio bearer processing method according to claim 1, wherein after establishing the SRB with the mobile terminal, the radio bearer processing method further comprises:
    transmitting first indication information to the master network device or the other secondary network device to indicate that the SRB has been established,
    wherein the first indication information comprises second sub-indication information used to indicate at least one of: an RRC message that needs to be transmitted by the secondary network device to the mobile terminal through the SRB, and an RRC message that needs to be reported by the mobile terminal through the SRB.

3. The radio bearer processing method according to claim 1, wherein after establishing the SRB with the mobile terminal, the radio bearer processing method further comprises:
    transmitting first configuration information of the RRC message to the mobile terminal, the first configuration information is used to indicate at least one of: an RRC message that needs to be reported by the mobile terminal through the SRB; and an RRC message that needs to be reported by the mobile terminal to the master network device.

4. The radio bearer processing method according to claim 3, wherein the first configuration information further comprises third sub-instruction information, and the third sub-instruction information is used to instruct the mobile terminal to, when it is determined a failure event related to the SRB and/or a Secondary Cell Group (SCG) occurs, perform one of the following:

after the failure event is recovered, reporting the RRC message that needs to be reported by the mobile terminal through the SRB;
reporting the RRC message that needs to be reported by the mobile terminal through other RBs in SCG where no failure event occurs;
reporting the RRC message that needs to be reported by the mobile terminal through the SRB to the master network device;
reporting the RRC message that needs to be reported by the mobile terminal through the SRB to a network device corresponding to a Master Cell Group (MCG); and
discarding the RRC message that needs to be reported by the mobile terminal through the SRB.

5. The radio bearer processing method according to claim 1, wherein after establishing the SRB with the mobile terminal, the radio bearer processing method further comprises:
receiving second instruction information from the master network device;
transmitting second configuration information to the mobile terminal based on the second instruction information, the second configuration information being used to instruct the mobile terminal to, when it is determined a failure event related to the SRB and/or a Secondary Cell Group (SCG) occurs, perform one of:
after the failure event is recovered, reporting the RRC message that needs to be reported by the mobile terminal through the SRB;
reporting the RRC message that needs to be reported by the mobile terminal through other RBs in SCG where no failure event occurs;
reporting the RRC message that needs to be reported by the mobile terminal through the SRB to the master network device;
reporting the RRC message that needs to be reported by the mobile terminal through the SRB to a network device corresponding to a Master Cell Group (MCG); and
discarding the RRC message that needs to be reported by the mobile terminal through the SRB.

6. The radio bearer processing method according to claim 1, wherein the SRB is a SRB3.

7. A network device, comprising a memory, a processor, and a computer program stored in the memory and executed by the processor, wherein the processor is configured to execute the computer program so as to implement a radio bearer processing method, the method comprises following steps:
establishing or refusing to establish, when a first event is detected, a signaling radio bearer (SRB) with a mobile terminal;
wherein the first event comprises at least one of: a secondary network device being added by a master network device accessed by the mobile terminal, configuration of the secondary network device being changed, or the mobile terminal being switched from another secondary network device to the secondary network device;
wherein the establishing the SRB with a mobile terminal comprises:
receiving first information from the master network device, the mobile terminal, the mobile terminal through the master network device or the other secondary network device, the first information being used to instruct or request the secondary network device to establish the SRB with the mobile terminal; and
establishing the SRB with the mobile terminal based on the first information;
wherein the first information comprises first sub-instruction information, and the first sub-instruction information is used to indicate at least one of: an RRC message that needs to be transmitted by the secondary network device to the mobile terminal through the SRB; or an RRC message that needs to be reported by the mobile terminal through the SRB.

8. The network device according to claim 7, wherein after establishing the SRB with the mobile terminal, the radio bearer processing method further comprises:
transmitting first indication information to the master network device or the other secondary network device to indicate that the SRB has been established,
wherein the first indication information comprises second sub-indication information used to indicate at least one of: an RRC message that needs to be transmitted by the secondary network device to the mobile terminal through the SRB, and an RRC message that needs to be reported by the mobile terminal through the SRB.

9. The network device according to claim 7, wherein after establishing the SRB with the mobile terminal, the radio bearer processing method further comprises:
transmitting first configuration information of the RRC message to the mobile terminal, the first configuration information is used to indicate at least one of: an RRC message that needs to be reported by the mobile terminal through the SRB; and an RRC message that needs to be reported by the mobile terminal to the master network device.

10. The network device according to claim 9, wherein the first configuration information further comprises third sub-instruction information, and the third sub-instruction information is used to instruct the mobile terminal to, when it is determined a failure event related to the SRB and/or a Secondary Cell Group (SCG) occurs, perform one of the following:
after the failure event is recovered, reporting the RRC message that needs to be reported by the mobile terminal through the SRB;
reporting the RRC message that needs to be reported by the mobile terminal through other RBs in SCG where no failure event occurs;
reporting the RRC message that needs to be reported by the mobile terminal through the SRB to the master network device;
reporting the RRC message that needs to be reported by the mobile terminal through the SRB to a network device corresponding to a Master Cell Group (MCG); and
discarding the RRC message that needs to be reported by the mobile terminal through the SRB.

11. The network device according to claim 7, wherein after establishing the SRB with the mobile terminal, the radio bearer processing method further comprises:
receiving second instruction information from the master network device;
transmitting second configuration information to the mobile terminal based on the second instruction information, the second configuration information being used to instruct the mobile terminal to, when it is determined a failure event related to the SRB and/or a Secondary Cell Group (SCG) occurs, perform one of:

after the failure event is recovered, reporting the RRC message that needs to be reported by the mobile terminal through the SRB;

reporting the RRC message that needs to be reported by the mobile terminal through other RBs in SCG where no failure event occurs;

reporting the RRC message that needs to be reported by the mobile terminal through the SRB to the master network device;

reporting the RRC message that needs to be reported by the mobile terminal through the SRB to a network device corresponding to a Master Cell Group (MCG); and discarding the RRC message that needs to be reported by the mobile terminal through the SRB.

12. The network device according to claim 7, wherein the SRB comprises a SRB3 used to transmit RRC messages Related to the secondary network device.

13. A non-transitory computer-readable storage medium storing therein a computer program, wherein the computer program is executed by a processor so as to implement:

establishing or refusing to establish, when a first event is detected, a signaling radio bearer (SRB) with a mobile terminal;

wherein the first event comprises at least one of: a secondary network device being added by a master network device accessed by the mobile terminal, configuration of the secondary network device being changed, or the mobile terminal being switched from another secondary network device to the secondary network device;

wherein the computer program is executed by a processor so as to implement:

receiving first information from the master network device, the mobile terminal, the mobile terminal through the master network device or the other secondary network device, the first information being used to instruct or request the secondary network device to establish the SRB with the mobile terminal; and establishing the SRB with the mobile terminal based on the first information;

wherein the first information comprises first sub-instruction information, and the first sub-instruction information is used to indicate at least one of: an RRC message that needs to be transmitted by the secondary network device to the mobile terminal through the SRB; or an RRC message that needs to be reported by the mobile terminal through the SRB.

14. The non-transitory computer-readable storage medium according to claim 13, wherein the SRB is a SRB3.

* * * * *